United States Patent
Baublits et al.

(10) Patent No.: US 12,302,915 B2
(45) Date of Patent: May 20, 2025

(54) PACKAGING WITH PRESSURE DRIVEN OXYGEN EGRESS

(71) Applicant: Tyson Foods, Inc., Springdale, AR (US)

(72) Inventors: Robert Ty Baublits, Springdale, CA (US); Harry Y. Chu, Fayetteville, AR (US)

(73) Assignee: Tyson Foods, Inc., Springdale, AR (US)

( * ) Notice: Subject to any disclaimer, the term of this patent is extended or adjusted under 35 U.S.C. 154(b) by 442 days.

(21) Appl. No.: 17/162,616

(22) Filed: Jan. 29, 2021

(65) Prior Publication Data

US 2021/0145029 A1   May 20, 2021

Related U.S. Application Data

(62) Division of application No. 16/148,846, filed on Oct. 1, 2018, now Pat. No. 10,925,300.
(Continued)

(51) Int. Cl.
   *B65D 81/18*   (2006.01)
   *A23B 2/704*   (2025.01)
   (Continued)

(52) U.S. Cl.
   CPC .......... *A23B 2/8055* (2025.01); *A23B 2/7045* (2025.01); *A23B 2/708* (2025.01);
   (Continued)

(58) Field of Classification Search
   None
   See application file for complete search history.

(56) References Cited

U.S. PATENT DOCUMENTS

| | | | | |
|---|---|---|---|---|
| 1,674,724 A | * | 6/1928 | House | B65D 85/32 |
| | | | | 217/3 BC |
| 2,149,412 A | * | 3/1939 | Bangs | B65D 81/18 |
| | | | | 62/372 |

(Continued)

FOREIGN PATENT DOCUMENTS

| | | |
|---|---|---|
| EP | 0174559 | 3/1986 |
| JP | 0487926 | 3/1992 |

(Continued)

OTHER PUBLICATIONS

Mohsin, Mahmood et al. "Thermal and Mechanical Properties of Poly(vinyl alcohol) Plasticized with Glycerol." Journal of Applied Polymer Science, vol. 122, 3102-3109 (2011) (Year: 2011).*

(Continued)

*Primary Examiner* — Viren A Thakur
(74) *Attorney, Agent, or Firm* — Duane Morris LLP

(57) ABSTRACT

Food preservation can include depositing dry ice and food within packaging. The packaging can include a flexible liner defining a wall aperture and an internal chamber. The internal chamber can receive the deposited dry ice and food and have an internal atmosphere. The packaging can include a check valve mounted to the flexible liner and covering the wall aperture. The check valve can be configured to occupy: (i) a closed state blocking fluid communication between the internal chamber and ambient via the wall aperture and (ii) an open state enabling fluid flow from the internal chamber, through the wall aperture, and into ambient.

19 Claims, 6 Drawing Sheets

Related U.S. Application Data

(60) Provisional application No. 62/567,657, filed on Oct. 3, 2017.

(51) Int. Cl.
| | | |
|---|---|---|
| *A23B 2/708* | (2025.01) | |
| *A23B 2/80* | (2025.01) | |
| *B65B 7/02* | (2006.01) | |
| *B65B 25/00* | (2006.01) | |
| *B65B 53/00* | (2006.01) | |
| *B65D 75/00* | (2006.01) | |
| *B65D 77/04* | (2006.01) | |
| *B65D 77/22* | (2006.01) | |
| *B65D 81/20* | (2006.01) | |

(52) U.S. Cl.
CPC .............. *B65B 7/02* (2013.01); *B65B 25/001* (2013.01); *B65B 53/00* (2013.01); *B65D 75/008* (2013.01); *B65D 77/04* (2013.01); *B65D 77/225* (2013.01); *B65D 81/18* (2013.01); *B65D 81/2084* (2013.01); *A23V 2002/00* (2013.01)

(56) References Cited

U.S. PATENT DOCUMENTS

| | | | | |
|---|---|---|---|---|
| 2,688,979 | A * | 9/1954 | Kendrick | F16K 15/147 137/849 |
| 3,245,428 | A * | 4/1966 | Klimak | F16J 15/064 137/493 |
| 4,134,535 | A | 1/1979 | Barthels et al. | |
| 4,532,652 | A | 7/1985 | Herrington | |
| 4,689,936 | A * | 9/1987 | Gaikema | B65D 81/34 53/440 |
| 4,899,517 | A | 2/1990 | Shima et al. | |
| 5,236,728 | A * | 8/1993 | Locke | B65B 55/20 206/521 |
| 5,332,095 | A | 7/1994 | Wu | |
| 5,354,569 | A * | 10/1994 | Brown | B65B 31/06 426/411 |
| 5,731,023 | A | 3/1998 | Milani | |
| 5,799,463 | A | 9/1998 | Kashiba | |
| 5,839,582 | A | 11/1998 | Strong et al. | |
| 5,931,189 | A | 8/1999 | Sweeney et al. | |
| 5,989,608 | A * | 11/1999 | Mizuno | A21D 10/02 219/735 |
| 6,054,153 | A | 4/2000 | Carr et al. | |
| 6,132,781 | A | 10/2000 | Carr et al. | |
| 6,210,725 | B1 | 4/2001 | Colombo | |
| 6,269,946 | B1 | 8/2001 | Colombo | |
| 6,380,524 | B1 | 4/2002 | Keller | |
| 6,634,384 | B2 | 10/2003 | Skeens et al. | |
| 6,637,939 | B2 | 10/2003 | Huffer | |
| 6,877,601 | B1 | 4/2005 | Colombo | |
| 7,137,738 | B2 | 11/2006 | Shah et al. | |
| 7,399,263 | B2 | 7/2008 | Hartman et al. | |
| 7,597,479 | B2 | 10/2009 | Zimmerman et al. | |
| 7,685,793 | B2 | 3/2010 | Newrones et al. | |
| 7,770,360 | B2 | 8/2010 | Smith et al. | |
| 8,061,899 | B2 | 11/2011 | Zimmerman et al. | |
| 8,112,971 | B2 | 2/2012 | Newrones et al. | |
| 8,307,864 | B2 | 11/2012 | Dobkins | |
| 8,419,279 | B2 | 4/2013 | Borchardt et al. | |
| 8,545,973 | B2 * | 10/2013 | Smolko | B65D 53/00 428/306.6 |
| 9,204,666 | B2 | 12/2015 | Ib et al. | |
| 9,346,589 | B2 | 5/2016 | Bunton | |
| 2002/0081041 | A1 * | 6/2002 | Malone | B65D 81/3825 383/3 |
| 2003/0189067 | A1 * | 10/2003 | Stull | B65D 47/2031 222/494 |
| 2006/0013929 | A1 * | 1/2006 | Morris | A23L 35/00 426/383 |
| 2006/0201576 | A1 | 9/2006 | Domening | |
| 2007/0034542 | A1 | 2/2007 | Cerreta | |
| 2007/0232473 | A1 * | 10/2007 | Hartman | B65D 77/225 493/157 |
| 2007/0292055 | A1 | 12/2007 | Reuhs | |
| 2008/0011752 | A1 | 1/2008 | Saitoh | |
| 2008/0134640 | A1 * | 6/2008 | Bowden | B65B 11/025 53/432 |
| 2008/0159660 | A1 | 7/2008 | Roell, III | |
| 2012/0027323 | A1 | 2/2012 | Vitallo et al. | |
| 2012/0128274 | A1 | 5/2012 | Lituchy | |
| 2013/0048125 | A1 * | 2/2013 | Hoffman | B65D 77/225 137/852 |
| 2014/0134303 | A1 * | 5/2014 | Barshak | A22C 29/02 426/129 |
| 2014/0353203 | A1 | 12/2014 | Hu et al. | |
| 2015/0183568 | A1 | 7/2015 | Wakabayashi | |
| 2017/0096278 | A1 | 4/2017 | Salazar | |
| 2017/0234446 | A1 * | 8/2017 | Maloney | F16K 15/144 137/513.5 |

FOREIGN PATENT DOCUMENTS

| | | | | |
|---|---|---|---|---|
| WO | 2015171034 | | 11/2015 | |
| WO | 2016146623 | | 9/2016 | |
| WO | WO-2017078587 A2 * | 5/2017 | | B65B 5/04 |

OTHER PUBLICATIONS

ChemEurope. Dec. 25, 2015 3pgs. <https://web.archive.org/web/20151225002745/https://www.chemeurope.com/en/encyclopedia/Polyethylene.html> (Year: 2015).*

Definition of "about" Merriam-Webster.com Mar. 6, 2016 <https://web.archive.org/web/20160306141536/https://www.merriam-webster.com/dictionary/about> (Year: 2016).*

* cited by examiner

PACKAGING WITH PRESSURE DRIVEN OXYGEN EGRESS

CROSS-REFERENCE TO RELATED APPLICATIONS

The present application is a divisional of and claims the benefit of U.S. Non-Provisional application Ser. No. 16/148,846 to Baublits and Chu (filed on Oct. 1, 2018), which claims the benefit of U.S. Provisional App. No. 62/567,657 to Baublits and Chu (filed on Oct. 3, 2017), the entirety of each is hereby incorporated herein by reference.

BACKGROUND

Field of the Disclosure

This disclosure relates to modified atmosphere packaging for food.

Description of Related Art

Modified atmosphere packaging (MAP) extends the life of packaged food. Compared with ambient air (21% oxygen, 78% nitrogen, 0.1% carbon-dioxide by volume), MAP typically has a lower concentration of oxygen and a greater concentration of carbon-dioxide. Nitrogen concentration can be the same, lower, or higher.

Existing MAP techniques include (a) gas-flushing and (b) compensated vacuuming. Gas-flushing dilutes air in the packaging with a desired gas mixture until producing a desired atmosphere. Compensated vacuuming removes air in the packaging and replaces the air with a desired gas mixture.

SUMMARY

Food preservation can include depositing dry ice and food within packaging. The packaging can include a flexible liner defining a wall aperture and an internal chamber. The internal chamber can receive the deposited dry ice and food and have an internal atmosphere. The packaging can include a check valve mounted to the flexible liner and covering the wall aperture. The check valve can be configured to occupy: (i) a closed state blocking fluid communication between the internal chamber and ambient via the wall aperture and (ii) an open state enabling fluid flow from the internal chamber, through the wall aperture, and into ambient. The check valve can be a one-way valve.

The food preservation can include closing the packaging by forming a seal across the flexible liner. The dry ice can sublimate within the closed packaging, pressurize the liner, and causes the check valve to occupy the open state. The fluid within the internal chamber can vent through the open check valve until pressure within the liner stabilizes with ambient, thus causing the check valve to occupy the closed state.

A food package can include packaging, dry ice, and food. The packaging can include: a flexible (a) liner defining a wall aperture and an inner chamber; and (b) a check valve mounted to the flexible liner over the wall aperture. The dry ice can be disposed within the inner chamber. The food can be disposed within the inner chamber. The food can be directly exposed and in contact with the dry ice.

BRIEF DESCRIPTION OF DRAWINGS

The specification may be read in conjunction with the appended Figures. The claimed inventions are not limited to the illustrative embodiments shown therein.

FIG. 1 is a cross sectional side elevational schematic view of a food package during a first venting stage.

FIG. 2 is a cross sectional side elevational schematic view of a food package during a second venting stage.

FIG. 3 is a cross sectional side elevational schematic view of a food package during a third venting stage.

FIG. 4 is a schematic plan view of a check valve of the food package from the perspective of plane 4-4 in FIG. 1.

FIG. 5 is a cross sectional side elevational schematic view of the check valve in a closed state and a fragmented portion of a liner from the perspective of plane 5-5 in FIG. 4.

FIG. 6 is from the same perspective as FIG. 5, but omits various features of the check valve and shows the check valve in an open state.

FIG. 7 is from the same perspective as FIG. 5, but omits various features of the check valve, shows the check valve in an open state, and depicts optional flap stops.

FIG. 8 is a block diagram of a method.

FIG. 9 is a cross sectional front elevational schematic view of the food package in FIG. 1.

DETAILED DESCRIPTION

The features disclosed herein can be embodied in various forms. Illustrative and non-limiting examples are shown in the Figures and discussed below. Features of the disclosed examples are optional. Implementations can include more, different, or fewer features.

Since the subject matter is described with illustrative examples, the claimed inventions are not limited to these examples. Changes and modifications can be made to the claimed inventions without departing from their spirit. It is intended that the claims cover implementations with such changes and modifications. The term approximately, substantially, or generally encompasses ±10%.

Figure 1:
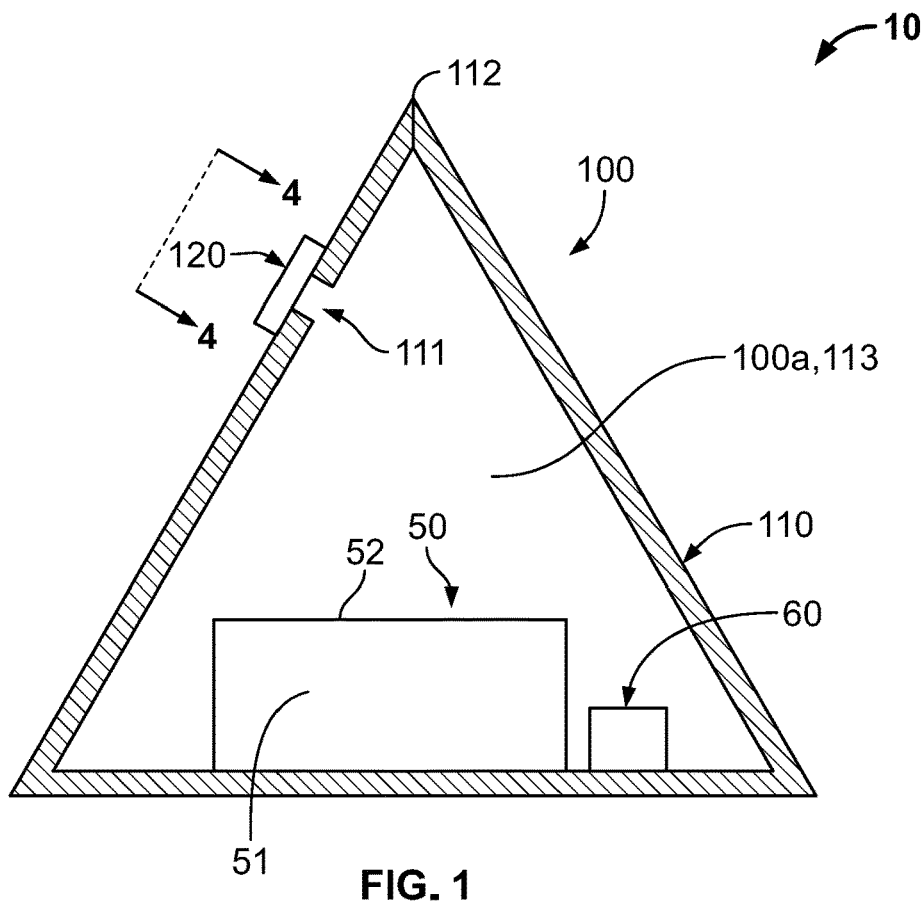
FIGS. 1-3 and 5-9 are not to scale. According to some examples.
Figure 2:
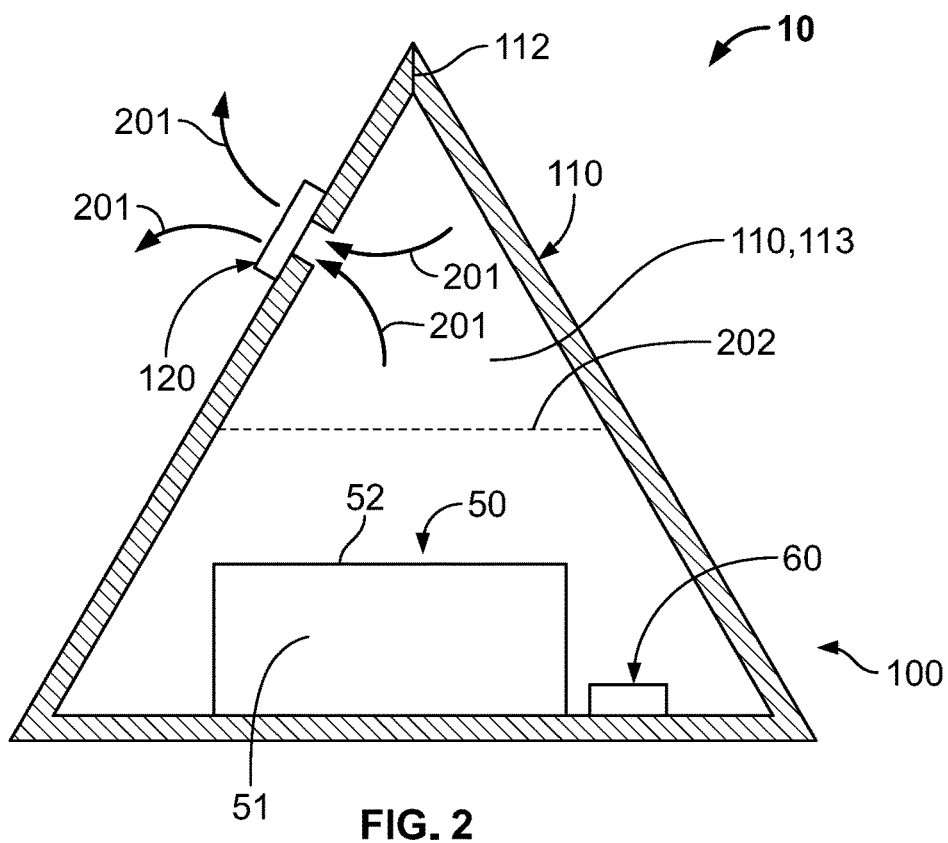
Figure 3:
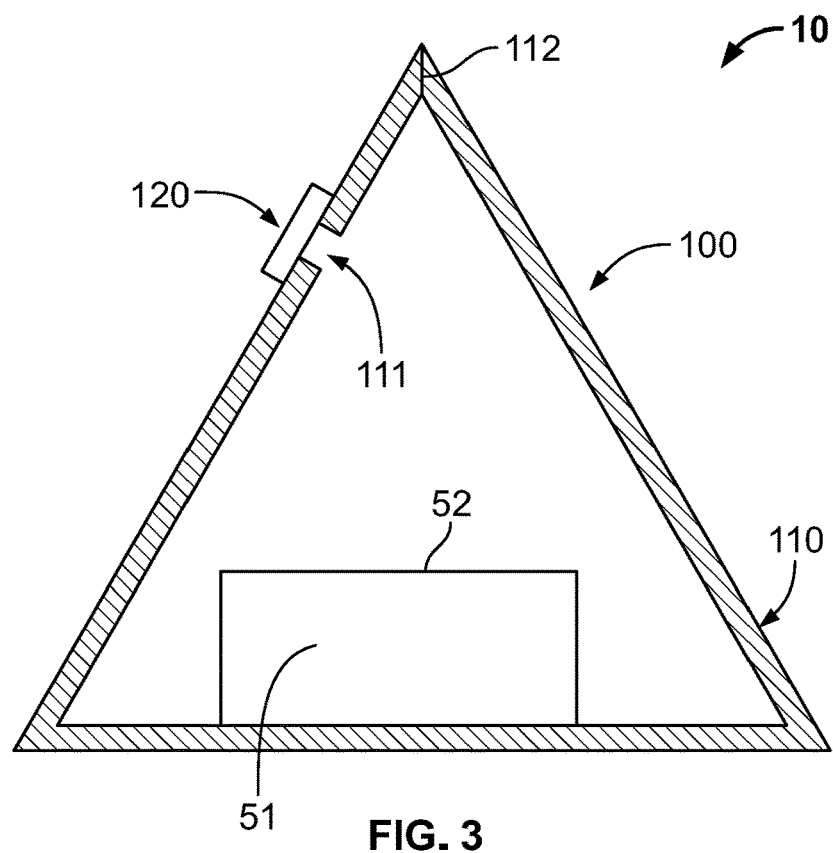

Referring to FIGS. 1-3, food package 10 can include packaging 100, one or more food units 50, and dry ice 60. Although shown as a single block, dry ice 60 can be in snow form, pellet form, and the like. Packaging 100 is configured to be sealed after receiving food units 50 and dry ice 60. Thereafter, dry ice 60 can sublimate into carbon dioxide gas (i.e., carbon dioxide fluid). The carbon dioxide gas can increase internal pressure within packaging 100, thus causing a check valve 120 to open (e.g., forcing check valve 120 to remain in an open state).

Check valve 120 can be a one-way valve. Check valve 120 can vent gas (e.g., a mixture of oxygen, nitrogen, and carbon dioxide) from inside packaging 100 to ambient until the internal pressure within packaging 100 stabilizes by equalizing with ambient pressure. Upon pressure stabilization, packaging 100 can have a modified internal atmosphere with a high carbon dioxide concentration, a low oxygen concentration, and a low nitrogen concentration (as compared with ambient). The modified and low-oxygen internal atmosphere can preserve food 51. For example, the low-oxygen internal atmosphere can inhibit bacterial growth on food 51. The low-oxygen internal atmosphere can inhibit oxidation of lipids and proteins in food 51.

The one or more food units 50 can be confined within packaging 100. Each food unit 50 can include food 51 and optionally (as with all features disclosed herein) wrapping 52. According to some examples, wrapping 52 is omitted and food 51 is directly exposed to the atmosphere within packaging 100.

Food 51 can be meat, vegetables, dairy, and the like. Food 51 can be for people, animals, or vegetation. Food 51 can be raw, cooked, or partially cooked. Food 51 can be replaced with any kind of object in need of transport. Wrapping 52 can form a seal about food 51.

Wrapping 52 can be packaging and can include a plurality of different layers. Wrapping 52 can divide food into a plurality of different compartments (not shown). Food 51 can be at a refrigerated temperature, ambient temperature, or heated temperature. Food 51 can never have been frozen before being deposited in packaging 100. Alternatively, food 51 can be deposited as frozen.

Packaging 100 can include one or more liners 110 and check valve 120 (also called a one-way valve or a valve). As shown in FIGS. 1-3, packaging 100 can include a single flexible liner 110 made from one or more air impermeable polymer (e.g., plastic) layers. Flexible liner 110 can include a plurality of different layers or only a single layer.

Flexible liner 110 can define an aperture 111, a seal 112, and an internal chamber 113. The internal atmosphere 100a of packaging 100 and/or liner 110 can be defined by the gas mixture within internal chamber 113. According to some examples, liner 110 can be rigid (e.g., a rigid air impermeable box).

Packaging 100 can be open or closed. In FIG. 1-3, packaging 100 is closed by virtue of seal 112. Seal 112 can be a heat seal or other kinds of seals (e.g., a reversible zip seal). Seal 112 is shown as being located at a top of packaging 100, but can be located in any convenient location. When closed, packaging 100 can be capable of fluid communication with ambient via check valve 120.

FIGS. 1-3 schematically show stages in the modification of internal atmosphere 100a. FIG. 1 can be a first stage. FIG. 2 can be a second stage. FIG. 3 can be a third stage. As used herein, "fluid" is intended to encompass gas phase matter and/or liquid phase matter. Therefore, "fluid" can be exclusively gas phase matter (e.g., a mixture of carbon dioxide gas, oxygen, and nitrogen), exclusively liquid phase matter (e.g., water), or a blend of both gas phase matter and liquid phase matter. According to some examples, the fluids disclosed herein consist essentially of gas phase matter.

In FIG. 1, food unit 50 and dry ice 60 have been deposited within internal chamber 113 and seal 112 has been formed. Dry ice 60 has not yet sublimated to a significant degree. Directly prior to dry ice 60 being deposited within internal chamber 113, internal atmosphere 100a can be equal to ambient (e.g., 21% oxygen, 78% nitrogen, 0.1% carbon-dioxide). Directly prior to dry ice 60 being deposited within internal chamber 113, internal pressure of packaging 100 can be equal to ambient. In one example, immediately prior to depositing the dry ice 60 and the food unit 50, the internal atmosphere has a pressure that is equal to ambient and the internal atmosphere comprises at least 19% oxygen by volume.

According to some examples, no gas-flushing or compensated vacuuming is performed on packaging 100 at any point during the life of packaging 100. According to some examples, from the time directly prior to dry ice 60 being deposited to the time directly after seal 112 is breached (to enable end-user access to food unit 50), no atmosphere modification techniques are performed on packaging 100 other than sublimation of dry ice 60 and passive gas venting through check valve 120.

FIG. 2 shows dry ice 60 having significantly sublimated into carbon dioxide gas. The carbon dioxide gas increases pressure within internal chamber 113, thus causing liner 110 to expand (not shown) and pressurize. The increased pressure forces gas 201 to egress through aperture 111 (also called a wall aperture) and check valve 120 into ambient.

Since carbon dioxide is heavier than oxygen, a lower portion of internal chamber 113 (below reference segment 202) can have a higher carbon dioxide concentration and a lower oxygen concentration. An upper portion of internal chamber 113 (above reference segment 202) can have a lower carbon dioxide concentration and a higher oxygen concentration.

When check valve 120 is disposed at a top of packaging 100, check valve 120 can primarily draw from the upper portion of internal chamber 113. Thus, escaping gas 201 can have a higher oxygen concentration and a lower carbon dioxide concentration than the average internal atmosphere 100a of packaging 100. FIGS. 1-3 and 9 show check valve 120 being disposed at a top of packaging 100.

According to some examples, check valve 120 can be disposed at an apex and/or extreme top of internal chamber 113. According to some examples, the height of check valve 120 and/or aperture 111 can at least 80, 85, 90, or 95% of a maximum height of internal chamber 113. According to some examples, check valve 120 is positioned such that when packaging 100 is disposed with the bin (discussed below with reference to FIG. 8), check valve 120 protrudes from a top of the bin (i.e., check valve 120 extends above a top-most horizontal plane of the bin).

FIG. 3 shows dry ice 60 having been completely sublimated into carbon dioxide gas. Check valve 120 has finished venting gas and has now closed. The pressure within internal chamber 113 can now have stabilized/equalized with ambient (e.g., the pressure within internal chamber 113 can be substantially equal to ambient). Therefore, after stabilization, packaging 100 can still be pressurized and liner 110 can still be at least partially expanded (not shown). Internal atmosphere 100a can now have a carbon dioxide concentration of at least 70, 75, 80, 85, 90, 95%. Internal atmosphere 100a can now have an oxygen concentration of less than 5%, 2.5%, 1%, 0.5%.

Figure 4:
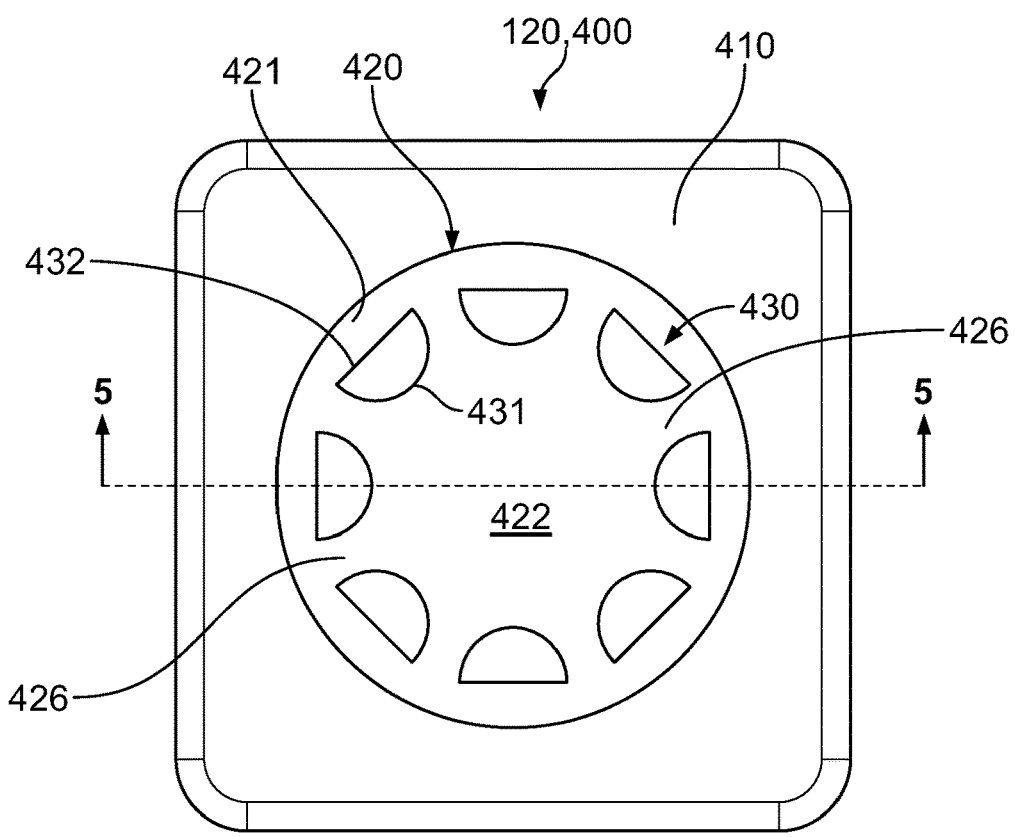
FIG. 4 is not to scale. According to other examples, FIG. 4 can be to scale.
Figure 5:
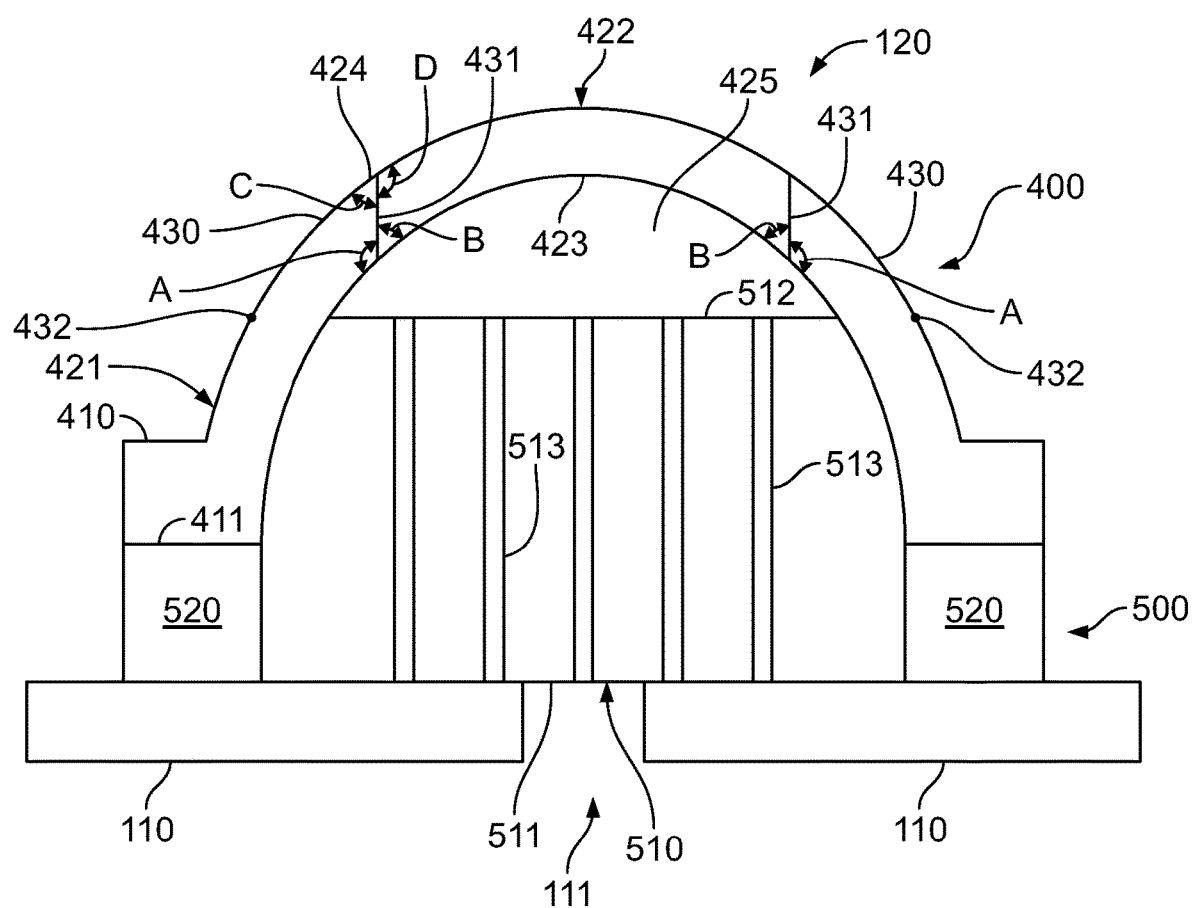
Figure 6:
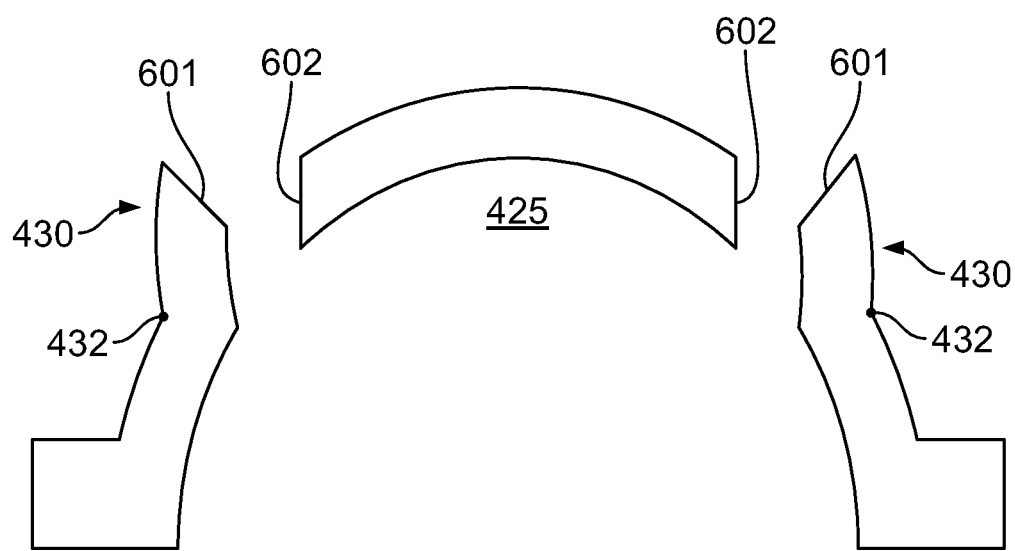
Figure 7:
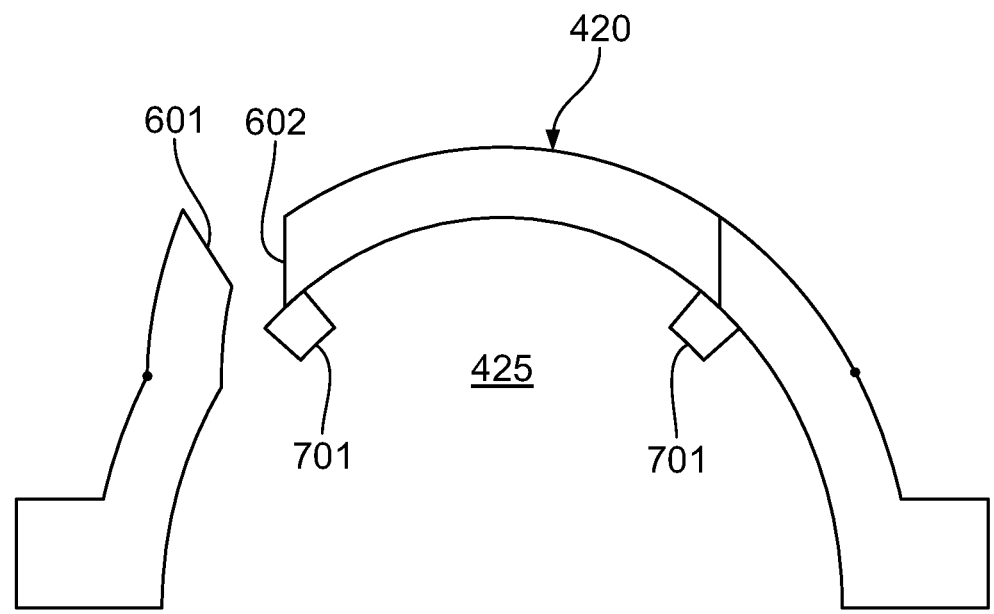
Figure 9:
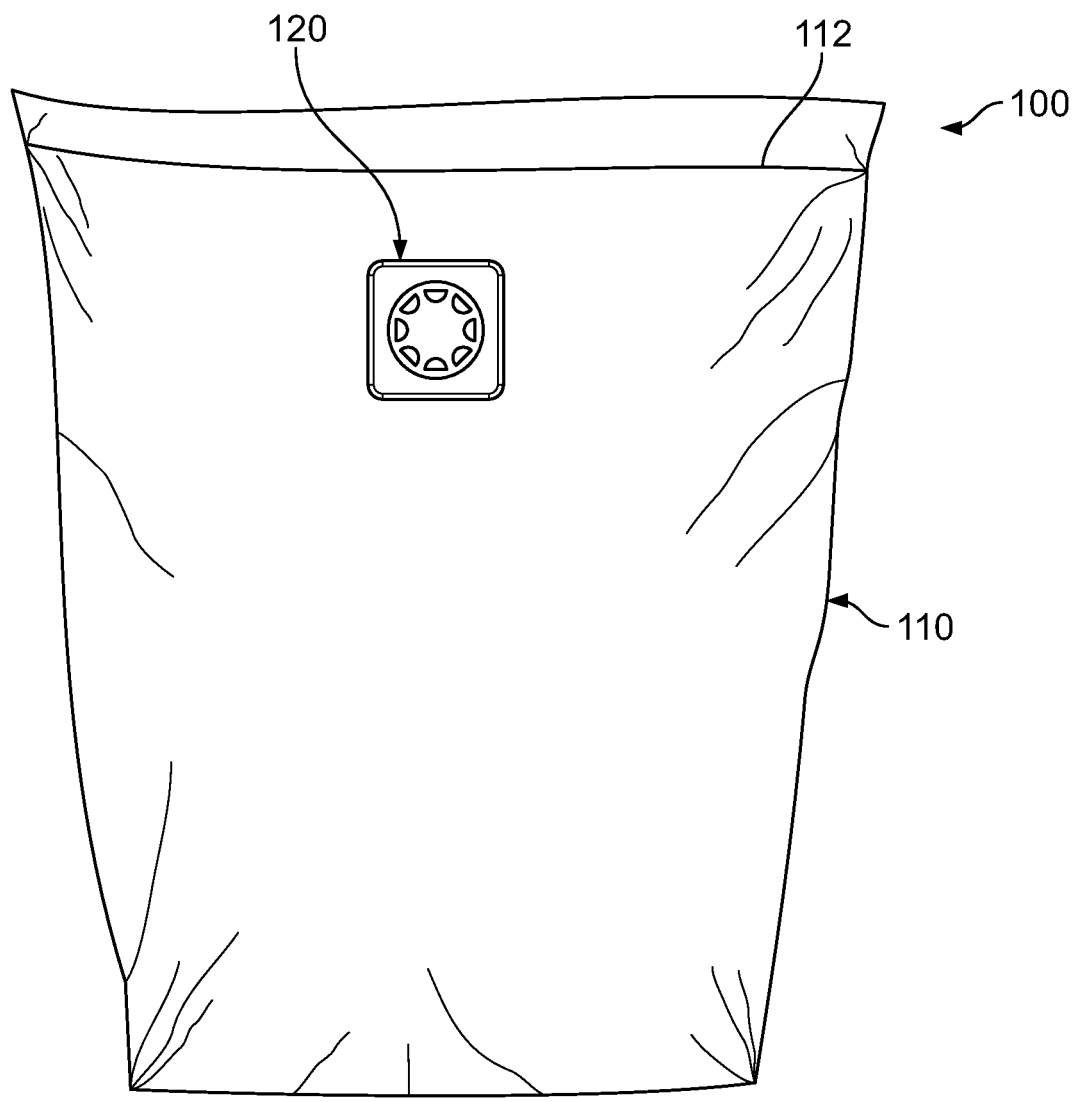

FIGS. 4-6 and 9 show an example of check valve 120 that can be used in FIGS. 1-3. FIG. 7 shows an optional additional feature of check valve 120. FIG. 4 is from the perspective of plane 4-4 in FIG. 1. FIG. 5 is from the perspective of plane 5-5 in FIG. 4. In FIGS. 4 and 5, check valve 120 is closed. FIG. 6 is from the same perspective as FIG. 5 with check valve 120 open. FIG. 7 is from the same perspective as FIG. 5 with check valve 120 open. FIG. 9 is an elevational view from the perspective of plane 4-4 in FIG. 1. For clarity, FIGS. 6 and 7 omit inner barrier 500 (discussed below). FIGS. 4, 6, and 7 omit packaging 100.

Referring to FIGS. 4-6, check valve 120 can be formed as a thin patch and include an outer barrier 400 and an inner barrier 500. Outer barrier 400 can be directly exposed to ambient. Outer barrier 400 can be made from a rigid polymer (e.g., plastic). Inner barrier 500 can include a film barrier 510 and an adhesive layer 520.

Gas can vent through film barrier 510, push outer barrier 400 open, and vent into ambient. When the pressure of atmosphere 100a (i.e., the pressure of inner chamber 113) stabilizes with ambient pressure, outer barrier 400 can close. Stabilization can occur before the pressure of inner chamber 113 equals ambient pressure or when the pressure of inner chamber 113 substantially equals ambient pressure.

Outer barrier 400 can include a peripheral base 400 and a dome 420. Dome 420 can be circular from a plan perspective (FIG. 4) a rectangular geometry from a plan perspective (not shown), and the like. A plurality of slits 431 can be cut into dome 420. As shown in FIG. 4, each slit 431 can be arced from the plan perspective. As shown in FIG. 5, each slit 431 can completely extend through dome 420. Dome 420 can define a dome chamber 425.

Slits 431 can define flaps 430. As shown in FIG. 4, flaps 430 can be co-circumferentially defined about dome (from a plan perspective). Flaps 430 can therefore divide dome 430 into a lower peripheral region 421 and an upper central region 422. Lower peripheral region 421 and upper central region 422 can be integrally joined along avenues 426 defined between consecutive flaps 430.

Each flap 430 can move upwards and downwards (compare FIG. 5 with FIG. 6) by pivoting about a crease 432 (also called a hinge). Each flap 430 can have a flat end face 601. Each end face 601 can be configured to seal (e.g., close) against a closing face 602 (also called a sealing face and a static face) of dome 420. Due to avenues 426, each flap 430 can be independently moveable.

With respect to an inner surface 423 of dome 420, end face 601 can define an angle A and closing face 602 can define an angle B. With respect to an outer surface 424 of dome 420, end face 601 can define an angle C and closing face 602 can define an angle D.

To prevent flaps 430 from protruding into dome chamber 425, and to encourage nesting of end face 601 and against closing face 602, angle A can be greater than 90 degrees and angle B can be less than 90 degrees. Alternatively or in addition, angle C can be less than 90 degrees and angle D can be greater than 90 degrees. As a consequence, each flap 430 can be configured to stop and close against upper central region 422 of dome 420. To further enhance the closing/sealing effect, one or more polymer layers (not shown) can be applied to outer face 601 and/or inner face 602.

Alternatively or in addition to the above configuration, dome 420 can include stops 701, Stops 701 can be adhered to the inner surface 423 of upper central region 422. As shown in FIG. 7, stops 701 are configured to prevent flaps 430 from protruding into dome chamber 425.

Returning to FIG. 5, inner barrier 500 can include a film barrier 510 (also called a central barrier) and an adhesive barrier 520 (also called a peripheral barrier). Adhesive barrier 520 can be an adhesive applied directly between peripheral base 410 and liner 110. Adhesive barrier 520 can be smeared across a complete lower surface 411 of peripheral base 410. Afterwards, outer barrier 400 can be contacted directly against liner 110. Adhesive barrier 520, upon drying and hardening, can be air impermeable and thus prevent air from seeping into aperture 111 from the periphery of check valve 120.

Film barrier 510 can be one or more perforated layers of film. According to some examples, and as discussed below, the vertical thickness of film barrier is exaggerated in FIG. 5 for clarity. The film can be a shrink film. FIG. 5 shows a single layer with channels 513. The single layer can be confined between adhesive barrier 520, outer barrier 400, and liner 110. Besides defining channels 513, film barrier 510 can include a lower surface 511 and an upper surface 512. The lower surface 511 can directly contact (and in some cases, flushly contact) liner 110.

According to some examples (not shown), film barrier 510 extends (e.g., partially extends) across the plane of adhesive to segment (partially or completely) adhesive barrier 520 into a lower portion and an upper portion. As such, adhesive can be applied directly underneath an outer periphery of film barrier 510 and film barrier 510 can be directly applied over aperture 111.

Afterwards, adhesive can be applied to the lower surface 411 of peripheral base 410 and peripheral base 410 can be applied on top of film barrier 510. Therefore, at least some perforations 413 defined in film barrier 510 can be sealed by adhesive. According to some examples, a bottom of the adhesive applied underneath peripheral base 410 is directly in contact with (a) a complete outer perimeter of a top surface of film barrier 510 and (b) a two-dimensionally closed region of liner 110.

Although channels 513 are shown as vertically extending in FIG. 5, some channels 513 can be horizontally extending. As shown in FIG. 5, each channel 513 can be configured to deliver gas (i.e., fluid). As further discussed below, the one or more layers of film barrier 510 can be thin. As a result, each channel 513 can be a perforation defined in the one or more layers.

The one or more layers of film barrier 510 can be made of a material with a lower melting point than the materials used to construct outer barrier 400 and/or liner 110. Therefore, if a certain temperature of heat is applied to packaging 100, the film barrier 510 can melt together to close channels 513. According to some examples, the heat is localized onto check valve 120 to avoid damaging liner 110 (e.g., blowing a narrow stream of hot air at check valve 120). As with all features disclosed herein, disabling the check valve 120 is optional.

During manufacturing, film barrier 510 can be applied to liner 110 before outer barrier 400 and adhesive barrier 520. Alternatively, film barrier 510 can be stuffed within dome chamber 425, then allowed to expand after outer barrier 400 is mounted to liner 110. Film barrier 510 can completely occupy dome chamber 425.

Although not shown, the top surface 512 of film barrier 510 can exist below (from the perspective of FIG. 5), creases 432. According to some examples, the top surface 512 of film barrier 510 can be coplanar with lower surface 411 (also called an undersurface) of peripheral base 410.

Film barrier 510 can flow pressurized gas into the empty portion of dome chamber 425. The pressure can bear against inner surface 423, causing flaps 430 to open. Each flap 430 can be biased to the closed position shown in FIG. 5. When the pressure in the empty portion of dome chamber 425 sufficiently reduces, flaps 430 can seal against closing surfaces 602. Alternatively or in addition, force from ingress of ambient into dome chamber 425 and/or gravity can cause flaps 430 to close.

Check valve 120 can have constructions other than those shown in FIGS. 4-7 and 9 and can be, for example, a poppet check valve. Instead of being applied on the outside of liner 110, check valve 120 can entirely exist within interior chamber 113 such that aperture 111 is fluidly downstream of check valve 120.

Figure 8:
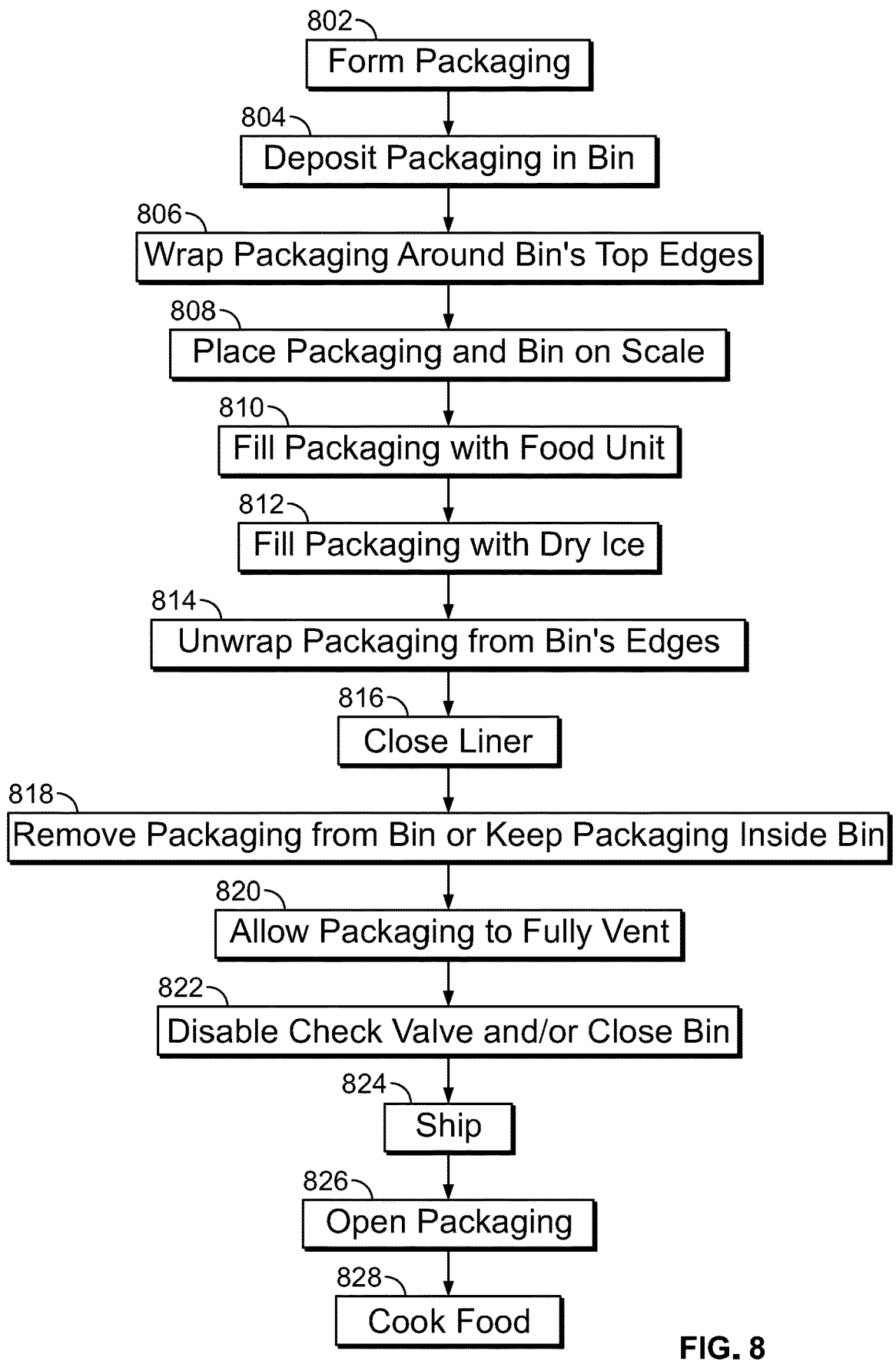

FIG. 8 shows a method of packaging food. At block 802, packaging 100 can be formed by assembling check valve 120 with liner 110. At block 804, packaging 100 can be deposited in a bin. The bin (not shown) can be an opened cardboard box (e.g., a cylindrical cardboard box) with a base defining an inner bin chamber and one or more closing flaps.

At block 806, packaging 100 can be wrapped around upper edges of the base (e.g., the edges where the closing flaps meet the base) and over the one or more closing flaps, similar to how a trashbag is wrapped around a trashcan. According to some examples, the closing flaps are absent (e.g., cut off).

At block 808, the packaging 100 plus bin can be placed on a scale. At block 810, packaging 100 can be filled with food unit 50 and the weight can be noted. According to some examples, the weight can be 680-1135 kg. The weight can be at least 250, 500, 750, or 1000 kg. Alternatively, the weight can be less than 1, 5, 10, 20, or 250 kg.

At block 812, packaging 100 can be automatically filled with dry ice 60 until the scale reads a predetermined weight. The dry ice 60 can be added as snow, pellets, etc.

Blocks 810 and 812 can occur in any order. Blocks 810 and 812 can occur in parallel. According to some examples, a food unit layer 50 (which can be unwrapped and uncovered food 51) is automatically deposited into packaging 100 until the scale has registered a first predetermined weight increase. Dry ice 60 can be automatically added until the scale has registered a second predetermined weight increase.

The process can repeat with layers of dry ice 60 being deposited directly above food unit 50 layers until a maximum weight is registered and/or a maximum number of dry ice layers have been applied. At this point, food package 10 can be automatically conveyed away from the scale (e.g., via a conveyer belt).

According to some examples, food 51 is raw and at a refrigerated temperature (e.g., 0° C.-7.2° C.) prior to contacting dry ice 60. Food 51 can have been never frozen prior to being deposited in packaging 100. The dry ice 60 can freeze food 51 for the first time. Due to the extreme temperatures of dry ice 60, the freezing process can be a quick freezing process to enhance the taste of food 51 when consumed.

At block 814, and if wrapped, packaging 100 can be unwrapped from the bin's edges. At block 816, liner 110 can be closed by forming seal 112 (stage 1). At block 818, food package 10 can be removed from the bin. Alternatively, food package 10 can remain in the bin until delivery to the end-user (discussed below).

According to some examples, and as previously discussed, the bin can include closing flaps. After block 818, 820, or 822, the flaps can be closed to form a top of the bin such that the inner bin chamber is three-dimensionally enclosed by the bin. Alternatively, a separate top (e.g., a separate lid) can be mounted and affixed to the bin. When three-dimensionally enclosed, the inner bin chamber can still be air permeable to enhance venting.

Food package 10 can be transported within the closed bin (e.g., within a closed cardboard box). Since food package 10 can be heavy, the bin (including the top) can be made from a stronger material than cardboard (e.g., metal). In this case, the bin and/or the lid can include apertures to enable gas exchange from the three-dimensionally enclosed packaging 100 and ambient external to the bin.

At block 820, packaging 100 can vent through check valve 120 (stage 2). The side walls of the bin's base can bear against the liner (after expansion) to squeeze packaging 100 and enhance flow rate of gas through check valve 120. To reduce the possibility that the internal pressure of packaging 100 bursts liner 110, the inner bin chamber (also called internal bin chamber) can be sized to prevent liner 110 from stretching to its maximum volume. Thus, during venting, the liner 110 can be stretched to a non-maximum volume and the liner 110 can bear against the bottom and each side of the bin's base.

The bin can be closed during venting, thus causing packaging 100 to bear against the bottom and each side of the bin's base, along with the bin's lid (whether formed by the closeable flaps or a distinct lid component) during at least some points in time during venting. The bin can be closed immediately after liner 110 is closed via seal 111. Alternatively, the bin can be open during venting, to enable check valve 120 to protrude above a top plane of the bin's base.

At block 822 (e.g., after a predetermined number of days or hours and reaching stage 3), check valve 120 can be disabled to prevent unwanted air ingress into liner 110 (since check valve 120 may not be a perfect one-way valve). As with all features disclosed herein, block 822 is optional and check valve 120 can remain intact. Disabling can be accomplished by (a) heat treating check valve 120 to seal slits 431, (b) applying an air impermeable sticker over check valve 120 where a periphery of the sticker directly adheres directly to liner 110. As previously discussed, the heat treating can be localized onto check valve 120.

Alternatively or in addition to disabling the check valve, and at block 822, packaging 100 can be squeezed after reaching a pressure equilibrium with ambient to force additional gas venting. When the squeezing is stopped, a pressure vacuum within liner 110 can force check valve 120 into a firm closed state. According to some examples, upon reaching pressure equilibrium, the packaging remains pressurized and protrudes from the bin. As such, the packaging can be squeezed to depressurize interior chamber 113 and allow the packaging to be fully confined within the bin inner chamber. After doing so, the bin can be closed.

At block 824, food package 10 can be shipped (e.g., within the bin). If the packaging is shipped within the bin, the bin can stop gravity from tearing food unit 50 through the bottom of liner 110. According to some examples, food unit 50 is sized to tear liner 110, due to gravity, without liner 110 being supported by the bin.

During transport, a plurality of closed bins storing food packages 10 can be palleted (e.g., stacked on a pallet and wrapped in shrink wrap). Block 824 can occur in parallel with blocks 820 and 822. At block 826, an end-user can open packaging 100 to access food unit 50. At block 828, the end-user can cook food 51.

According to some examples, at no point during blocks 802-824 is packaging 100 subject to gas-flushing or compensated vacuuming. According to some examples, at no point during blocks 802-824 is atmosphere 100a actively modified. According to some examples, at no point during blocks 802-824 is the chemical makeup atmosphere 100a passively modified other than via sublimation of dry ice 60, venting, and nominal ingress of air through check valve 120 (since check valve 120 may not perfectly vent in a single direction). Food package 10 can be kept at freezing temperatures after dry ice is added and until being delivered to the end user. Food package 10 can be kept below −1.1° C., −6.6° C., −12.2° C., or −17.7° C. after dry ice is added and until being delivered to the end user.

Food packages 10 similar to those in FIGS. 1-3 were prepared (although without aperture 111 and without check valve 120). Some of these food packages were subjected to gas-flushing and others were subjected to compensated vacuuming. After closing seal 112, these packages had an oxygen concentration of 2-5%. After seven days, the oxygen concentration reached 3-10%. These concentrations were measured in ppm by unit volume.

Food packages 10 consistent with FIGS. 1-3 were prepared and tested. After one minute, the concentration of oxygen in atmosphere 100a dropped below 1%. After eighteen days, the concentration of oxygen in atmosphere 100a dropped below 0.2%. Surprisingly, after fifty six days, the concentration of oxygen in atmosphere 100a remained below 1%. These concentrations were measured in ppm by unit volume.

We claim:

1. A food package comprising:
   packaging comprising:
   a flexible liner defining a wall aperture and an internal chamber, the internal chamber having an internal atmosphere;
   a check valve mounted to the flexible liner and covering the wall aperture, wherein said check valve is configured to occupy:
     (i) a closed state blocking fluid communication between the internal chamber and ambient via the wall aperture, and
     (ii) an open state enabling fluid flow from the internal chamber, through the wall aperture, and into ambient;
   said check valve comprising an inner barrier and a rigid outer barrier, the rigid outer barrier forming a dome, and the inner barrier comprising a peripheral adhesive and a central inner barrier comprising one or more layers of perforated film, the central inner barrier and the rigid outer barrier having different material compositions, the one or more layers of perforated film having a melting temperature less than the rigid outer barrier to permit the one or more layers of perforated film to melt and close perforations in the one or more layers of perforated film to permanently seal the check valve in the closed state when localized heat is applied to the check valve; and
   said check valve disposed completely external to the interior chamber such that venting fluid crosses the wall aperture before reaching the check valve.

2. The package of claim 1, wherein the check valve inner barrier comprises a ring of adhesive disposed about the one or more perforated film layers, wherein the ring of adhesive is in contact with each of the one or more perforated film layers.

3. The package of claim 1, wherein the outer barrier comprises a plurality of flaps configured to occupy a plurality of open positions and a fully closed position, each of the plurality of flaps being biased by an internal spring force to the fully closed position.

4. An assembly comprising the package of claim 1 disposed in an outer bin, the outer bin being made from at least one of metal and cardboard.

5. The package of claim 1, wherein the peripheral adhesive is disposed between ambient and the liner, and between ambient and the central inner barrier.

6. The package of claim 1, wherein the rigid outer barrier comprises a peripheral base connected to the dome, the dome comprising a plurality of flaps, each flap being configured to stop against a closing surface on the dome.

7. The package of claim 6, wherein each flap is formed by a slit cut into the dome, each flap is configured to open by hinging about a crease defined in the dome, and each flap is biased by an internal spring force toward a closed position where the flap is stopped against the closing surface.

8. The package of claim 1 further comprising dry ice and food disposed within and closed in the internal chamber, wherein the check valve is configured to allow the internal atmosphere within the internal chamber to vent through the open check valve until pressure within the liner stabilizes with ambient, thus causing the check valve to occupy the closed state, and the internal chamber having an oxygen concentration that is less than 1% by volume within ninety seconds of closing the dry ice and food in the internal chamber.

9. The package of claim 8, wherein a weight of the food is sufficient to rip the flexible liner.

10. The package of claim 8, wherein immediately prior to depositing the dry ice and the food, the internal atmosphere has a pressure that is equal to ambient and the internal atmosphere comprises at least 19% oxygen by volume.

11. The package of claim 10, wherein the flexible liner and the check valve are configured such that no active atmospheric modification process is required to be applied to the internal atmosphere after depositing the food and dry ice within the internal chamber and before the oxygen concentration of the internal atmosphere becomes less than 1% by volume.

12. The package of claim 8, further comprising a bin that includes a bottom and a plurality of side walls, the packaging being positioned in the bin prior to the dry ice and food being deposited in the internal chamber, the food being deposited into the packaging as raw and at a refrigerated temperature, the dry ice flash freezing the food,
   wherein the food has never been frozen prior to being deposited into the packaging.

13. The package of claim 12, wherein the flexible liner is positioned about a top perimeter of the bin, the top perimeter being defined by top surfaces of the plurality of side walls.

14. The package of claim 13, wherein the bin comprises a closing flap configured to close the packaging inside the plurality of side walls after the liner equilibrates with ambient.

15. The package of claim 12, wherein:
   the bin is a first bin and the packaging is a first packaging;
   the package further comprising a second packaging disposed within a second bin;
   the first bin encloses the first packaging and the second bin encloses the second packaging, the first bin and the second bin disposed on a pallet and shrink wrapped.

16. The package of claim 1, wherein the outer barrier comprises a plurality of flaps positioned co-circumferentially on the dome.

17. The package of claim 1, wherein the outer barrier comprises a plurality of flaps configured to move from a closed position to an open position, each flap of the plurality of flaps comprising an end face configured to seal against a closing face on the dome.

18. The package of claim 17, wherein each end face is a flat surface.

19. The package of claim 17, wherein the closing face on the dome is static.

* * * * *